United States Patent
Li

(10) Patent No.: US 12,520,176 B2
(45) Date of Patent: Jan. 6, 2026

(54) METHOD AND APPARATUS FOR BROADCASTING INDICATION, AND METHOD AND APPARATUS FOR RECEIVING INDICATION

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 463 days.

(21) Appl. No.: 18/013,708

(22) PCT Filed: Jul. 15, 2020

(86) PCT No.: PCT/CN2020/102171
§ 371 (c)(1),
(2) Date: Dec. 29, 2022

(87) PCT Pub. No.: WO2022/011609
PCT Pub. Date: Jan. 20, 2022

(65) Prior Publication Data
US 2023/0300642 A1    Sep. 21, 2023

(51) Int. Cl.
*H04W 24/08* (2009.01)
*H04W 52/02* (2009.01)
(Continued)

(52) U.S. Cl.
CPC ....... *H04W 24/08* (2013.01); *H04W 52/0235* (2013.01); *H04W 68/02* (2013.01); *H04W 72/23* (2023.01)

(58) Field of Classification Search
CPC . H04W 24/08; H04W 52/0235; H04W 68/02; H04W 68/00; H04W 72/23;
(Continued)

(56) References Cited

U.S. PATENT DOCUMENTS 12,309,098 B2 *   5/2025   Yi .................. H04L 1/1671
12,309,803 B2 *   5/2025   Zhang ............. H04W 72/23
(Continued)

FOREIGN PATENT DOCUMENTS

CN    101115288 A         1/2008
CN    102577571 A  *  7/2012  .......... H04L 5/0037
(Continued)

OTHER PUBLICATIONS

Google Patents translation of WO2021174430A1 (Year: 2021).*
(Continued)

*Primary Examiner* — Sujoy K Kundu
*Assistant Examiner* — Vladislav Y Agureyev
(74) *Attorney, Agent, or Firm* — Volpe Koenig

(57) ABSTRACT

The present disclosure provides a method and apparatus for broadcasting an indication, and a method and apparatus for receiving an indication. The method for broadcasting the indication is applicable to a base station and includes broadcasting monitoring indication information, where the monitoring indication information is configured to indicate a first type user equipment to monitor paging signaling or to indicate a second type user equipment to monitor the paging signaling.

10 Claims, 6 Drawing Sheets

Monitoring indication information broadcast by a base station is received — S201

It is determined whether to monitor paging signaling according to the monitoring indication information — S202

(51) Int. Cl.
*H04W 68/02* (2009.01)
*H04W 72/23* (2023.01)

(58) Field of Classification Search
CPC ....... H04W 4/06; H04W 48/12; H04W 76/40; Y02D 30/70
See application file for complete search history.

(56) References Cited

U.S. PATENT DOCUMENTS

| | | | |
|---|---|---|---|
| 2014/0211750 A1 | 7/2014 | Larsson et al. | |
| 2015/0031382 A1 | 1/2015 | Damnjanovic et al. | |
| 2015/0230182 A1 | 8/2015 | Deivasigamani et al. | |
| 2016/0014752 A1* | 1/2016 | Papasakellariou | H04L 5/0076 370/329 |
| 2018/0324701 A1* | 11/2018 | Sun | H04W 4/06 |
| 2020/0022146 A1* | 1/2020 | Huangfu | H04L 1/0057 |
| 2020/0120713 A1* | 4/2020 | Yerramalli | H04W 52/362 |
| 2020/0137717 A1 | 4/2020 | Liu | |
| 2020/0163048 A1* | 5/2020 | Kim | H04W 72/12 |
| 2020/0221416 A1* | 7/2020 | Wong | H04W 68/005 |
| 2020/0396687 A1 | 12/2020 | Hwang et al. | |
| 2020/0404617 A1* | 12/2020 | Murray | H04W 16/28 |
| 2021/0314979 A1* | 10/2021 | Agiwal | H04L 5/0032 |
| 2022/0240187 A1* | 7/2022 | Guo | H04W 76/30 |
| 2022/0286964 A1* | 9/2022 | Peng | H04W 52/0219 |
| 2022/0369300 A1* | 11/2022 | Zhang | H04W 72/0453 |
| 2022/0394452 A1* | 12/2022 | Chen | H04W 4/90 |
| 2022/0394664 A1* | 12/2022 | Xie | H04W 68/005 |
| 2022/0417811 A1* | 12/2022 | Xin | H04W 36/06 |
| 2023/0084797 A1* | 3/2023 | Shan | H04W 68/025 455/458 |
| 2023/0269601 A1* | 8/2023 | Laselva | H04B 7/06952 370/329 |
| 2023/0328749 A1* | 10/2023 | Liu | H04W 4/06 370/330 |
| 2024/0008050 A1* | 1/2024 | Zhou | H04W 56/001 |

FOREIGN PATENT DOCUMENTS

| | | | | |
|---|---|---|---|---|
| CN | 103209481 A | | 7/2013 | |
| CN | 105340334 A | * | 2/2016 | ........ H04W 52/0216 |
| CN | 105792091 A | | 7/2016 | |
| CN | 109496452 A | | 3/2019 | |
| CN | 110099447 A | | 8/2019 | |
| CN | 1110393027 A | | 10/2019 | |
| CN | 110972237 A | | 4/2020 | |
| CN | 111132280 A | | 5/2020 | |
| CN | 111165035 A | * | 5/2020 | ........ H04W 52/0229 |
| CN | 111200870 A | | 5/2020 | |
| CN | 111225433 A | * | 6/2020 | .......... H04W 72/046 |
| CN | 111345075 A | | 6/2020 | |
| CN | 113271608 A | * | 8/2021 | ............. H04L 5/001 |
| CN | 113677002 A | * | 11/2021 | ............ H04W 68/00 |
| CN | 115552997 A | * | 12/2022 | ............ H04W 68/02 |
| CN | 112567819 B | * | 8/2024 | ............ H04W 68/02 |
| CN | 113630878 B | * | 11/2024 | ........ H04W 72/0446 |
| EP | 3737188 A1 | | 11/2020 | |
| WO | 2018195798 A1 | | 11/2018 | |
| WO | 2018210135 A1 | | 11/2018 | |
| WO | WO-2018201499 A1 | * | 11/2018 | .......... H04W 68/005 |
| WO | 2019125748 A1 | | 6/2019 | |
| WO | 2019148920 A1 | | 8/2019 | |
| WO | 2020032740 A1 | | 2/2020 | |
| WO | 2020063928 A1 | | 4/2020 | |
| WO | WO-2021134572 A1 | * | 7/2021 | |
| WO | WO-2021174401 A1 | * | 9/2021 | |
| WO | WO-2021174430 A1 | * | 9/2021 | |

OTHER PUBLICATIONS

European Patent Office, Extended European Search Report Issued in Application No. 209454453, Jul. 18, 2023, Germany, 12 pages.

Apple Inc, "PDCCH Monitoring for Reduced Capability Devices",3GPP TSG-RAN WG1 #101, R1-2004252,e-Meeting, May 25-Jun. 5, 2020, 3 pages.

MediaTek Inc,"Remaining issues on PDCCH-based power saving signal", 3GPP TSG RAN WG1 #101,R1-2003664,e-Meeting, May 25-Jun. 5, 2020, 4 pages.

InterDigital Inc, "Complexity reduction features for reduced capability NR devices",3GPP TSG RAN WG1 #101,R1-2004314,e-Meeting, May 25-Jun. 5, 2020, 3 pages.

Ericsson, "UE-group wake-up signal in NB-Iot", 3GPP TSG-RAN WG1 Meeting #95,R1-1812127,Spokane, U.S.A., Nov. 12-16, 2018, 11 pages.

ISA State Intellectual Property Office of the People's Republic of China, Written Opinion of the International Searching Authority Issued in Application No. PCT/CN2020/102171, Apr. 15, 2021, WIPO, 6 pages.

State Intellectual Property Office of the People's Republic of China, Office Action and Search Report Issued in Application No. 2022113059525, Mar. 21, 2025, 18 pages.

India Office Action issued on Dec. 5, 2023 for Indian Patent Application No. 202317006821.

ISA State Intellectual Property Office of the People's Republic of China, International Search Report Issued in Application No. PCT/CN2020/102171, Apr. 15, 2021, WIPO, 6 pages.

State Intellectual Property Office of the People's Republic of China, Office Action and Search Report Issued in Application No. 2020800015284, Aug. 16, 2021, 24 pages.

State Intellectual Property Office of the People's Republic of China, Office Action and Search Report Issued in Application No. 2020800015284, Feb. 28, 2022, 8 pages.

MediaTek Inc. (Moderator) "Rel-17 UE Power Saving: Summary of Email Discussion" "3GPP TSG RAN Meeting#86 RP-193089 Dec. 9-12, 2019, Sitges, Spain" Dec. 12, 2019,28 pages.

Ericsson "Corrections for UE-group wake-up signal for LTE-MTC" "3GPP TSG-RAN WG1 Meeting #101-e R1-2004654 eMeeting, May 25-Jun. 5, 2020" Jun. 5, 2020,4 pages.

Vivo et al."RRM relaxation for Reduced Capability NR devices" "3GPP TSG RAN WG1 #101 R1-2003434 e-Meeting, May 25-Jun. 5, 2020" May 16, 2020,5 pages.

ZTE "Discussion on Wake-up signal for MTC" "3GPP TSG RAN WG1 Meeting #98bis R1-1910262 Chongqing, China, Oct. 14-20, 2019" Oct. 5, 2019,7 pages.

* cited by examiner

FIG. 1

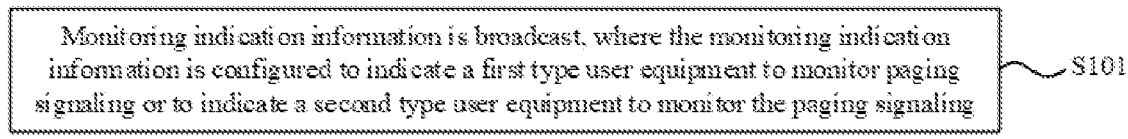
Monitoring indication information is broadcast, where the monitoring indication information is configured to indicate a first type user equipment to monitor paging signaling or to indicate a second type user equipment to monitor the paging signaling ~S101

| Bit | Short Message |
|---|---|
| 1 | *systemInfoModification* <br> If set to 1: indication of a BCCH modification other than SIB6, SIB7 and SIB8. |
| 2 | *etwsAndCmasIndication* <br> If set to 1: indication of an ETWS primary notification and/or an ETWS secondary notification and/or a CMAS notification. |
| 3-8 | Not used in this release of the specification, and shall be ignored by UE if received. |

FIG. 2- PRIOR ART

| Bit | Short Message |
|---|---|
| 1 | *systemInfoModification* <br> If set to 1: indication of a BCCH modification other than SIB6, SIB7 and SIB8. |
| 2 | *etwsAndCmasIndication* <br> If set to 1: indication of an ETWS primary notification and/or an ETWS secondary notification and/or a CMAS notification. |
| 3 | *systemInfoModification-NR-Lite* <br> If set to 1: indication of a BCCH modification other than SIB6, SIB7 and SIB8. |
| 4 | *etwsAndCmasIndication-NR-Lite* <br> If set to 1: indication of an ETWS primary notification and/or an ETWS secondary notification and/or a CMAS notification. |
| 5-8 | Not used in this release of the specification, and shall be ignored by UE if received. |

FIG. 3

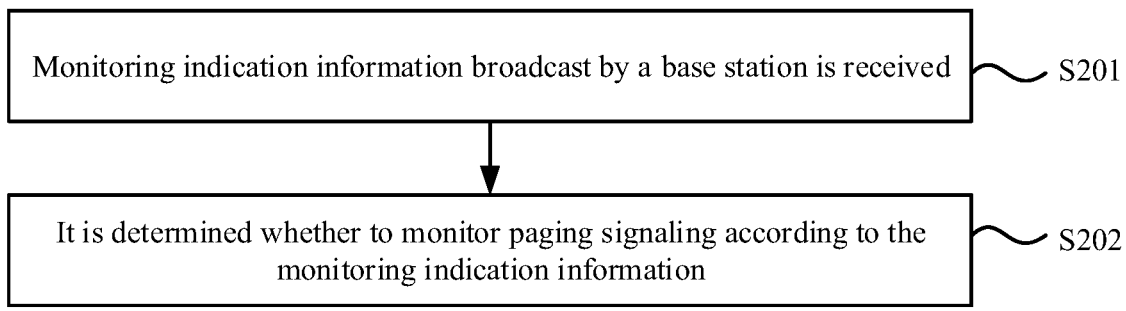

FIG.4

METHOD AND APPARATUS FOR BROADCASTING INDICATION, AND METHOD AND APPARATUS FOR RECEIVING INDICATION

CROSS REFERENCE TO RELATED APPLICATIONS

This application is the national phase of International Application No. PCT/CN2020/102171 filed on Jul. 15, 2020, the disclosure of which is hereby incorporated by reference in its entirety.

TECHNICAL FIELD

The present disclosure relates to the field of communication technologies, and in particular to a method for broadcasting an indication, an apparatus for broadcasting an indication, a method for receiving an indication, an apparatus for receiving an indication, an electronic device and a computer readable storage medium.

BACKGROUND

In 5G New Radio (NR), in addition to general user equipment (UE), reduced capability UE (that is, user equipment with reduced capability, or NR-lite user equipment) is also introduced. Compared with the general user equipment, this kind of user equipment has low cost, low complexity, a certain degree of coverage enhancement, and power saving.

In current 5G scenarios, a base station can schedule one or more user equipment by broadcasting paging signaling, and all the user equipment covered by the base station will receive the paging signaling. However, since it is necessary for the reduced capability user equipment to satisfy the certain degree of coverage enhancement, it is necessary for the base station to repeatedly broadcast the paging signaling for many times according to requirements of the reduced capability user equipment to ensure that the reduced capability user equipment can receive the paging signaling. Although it is necessary for the general user equipment not to repeat many times to receive the paging signaling, it is still necessary for the general user equipment to monitor the paging signaling together with the reduced capability user equipment for many times, thereby resulting in a waste of resources for the general user equipment.

SUMMARY

Embodiments of the present disclosure provide a method for broadcasting an indication, an apparatus for broadcasting an indication, a method for receiving an indication, an apparatus for receiving an indication, an electronic device and a computer readable storage medium.

According to a first aspect of the embodiments of the present disclosure, there is provided a method for broadcasting an indication, being applicable to a base station, including broadcasting monitoring indication information, where the monitoring indication information is configured to indicate a first type user equipment to monitor paging signaling or to indicate a second type user equipment to monitor the paging signaling.

According to a second aspect of the embodiments of the present disclosure, there is provided a method for receiving an indication, being applicable to a terminal, including: receiving monitoring indication information broadcast by a base station; and determining whether to monitor paging signaling according to the monitoring indication information.

According to a third aspect of the embodiments of the present disclosure, there is provided an electronic device, including:
a processor; and
a memory for storing instructions executable by the processor,
where the processor is configured to implement the method for broadcasting the indication described in any one of the above embodiments and/or the method for receiving the indication described in any one of the above embodiments.

BRIEF DESCRIPTION OF THE DRAWINGS

In order to explain the technical solutions more clearly in the embodiments of the present disclosure, the drawings required for the description of the embodiments will be briefly introduced below. It is obvious that the drawings in the following description are only some embodiments of the present disclosure. For those of ordinary skill in the art, other drawings can also be obtained based on these drawings, without paying any creative labor.

FIG. 1 is a schematic flowchart illustrating a method for broadcasting an indication according to an embodiment of the present disclosure.

FIG. 2 is a schematic diagram of a short message in the related art.

FIG. 3 is a schematic diagram of a short message according to an embodiment of the present disclosure.

FIG. 4 is a schematic flowchart illustrating a method for receiving an indication according to an embodiment of the present disclosure.

DETAILED DESCRIPTION OF THE EMBODIMENTS

Figure 5:
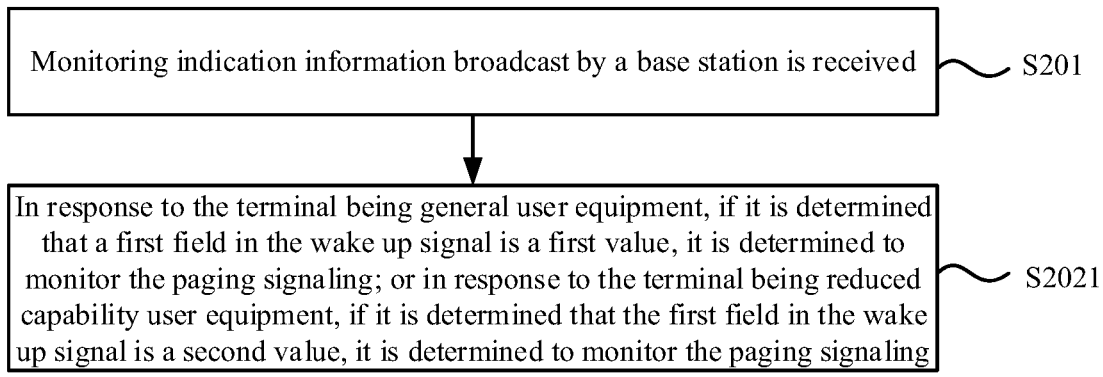
FIG. 5 is a schematic flowchart illustrating a method for receiving an indication according to an embodiment of the present disclosure.

The technical solutions in the embodiments of the present disclosure will be described clearly and completely below in combination with the drawings in the embodiments of the present disclosure. Obviously, the described embodiments are only part of the embodiments of the present disclosure, not all of them. Based on the embodiments in the disclosure, all other embodiments obtained by ordinary technicians in the art without doing creative work belong to the scope of the disclosure.

FIG. 1 is a schematic flowchart illustrating a method for broadcasting an indication according to an embodiment of the present disclosure. The method shown in this embodiment can be applied to a base station. The base station can be a 5G base station, and can communicate with a terminal as user equipment. The terminal can include, but is not limited to, an electronic device such as a mobile telephone, a tablet computer, a wearable device, a sensor, and an Internet of Things (IoT) device.

As shown in FIG. 1, the method for broadcasting the indication can include step S101. In step S101, monitoring indication information is broadcast, where the monitoring indication information is configured to indicate a first type user equipment to monitor paging signaling or to indicate a second type user equipment to monitor the paging signaling.

In one embodiment, the base station can first broadcast the monitoring indication information before broadcasting the paging signaling, and then can instruct the first type user equipment to monitor the paging signaling or instruct the second type user equipment to monitor the paging signaling through the monitoring indication information. The first type user equipment and the second type user equipment can periodically monitor the monitoring indication information. In response to that the monitoring, the indication information includes an identifier corresponding to the first type or an identifier corresponding to the second type, after receiving the monitoring indication information, the user equipment can determine whether the monitoring indication information is indicated for the user equipment itself according to the identifier in the monitoring indication information.

The first type user equipment and the second type user equipment can be set as required, and these two types user equipment belong to different types. In some embodiments, a UE capability of the second type user equipment is lower than a UE capability of the first type user equipment. For example, the first type user equipment can be general user equipment, which can also be called as legacy UE (that is, traditional user equipment); and the second type user equipment can be reduced capability UE (that is, user equipment with reduced capability). These are just examples. In all embodiments of the present disclosure, various types user equipment can be included, and not only the first type user equipment and the second type user equipment. In all embodiments of the present disclosure, the user equipment can be of any type, and the embodiments of the present disclosure are not limited to this.

However, for the convenience of explanation, in the following embodiments of the present disclosure, taking two types of user equipment included in a system as an example, where the first type user equipment is the general user equipment, which can also be called legacy UE (that is, traditional user equipment); and the second type user equipment is the reduced capability UE (that is, the user equipment with reduced capability).

According to the embodiments of the present disclosure, different types of user equipment can be instructed to monitor paging signaling through the monitoring indication information, so that it is unnecessary for the different types of user equipment to monitor the paging signaling broadcast by the base station together. Therefore, when it is necessary for the base station to broadcast the paging signaling according to a larger one of a number of times of broadcasting, user equipment that is to monitor the paging signaling according to a smaller one of the number of times of broadcasting can skip monitoring, thereby avoiding a waste of resources for the user equipment.

For example, if the base station repeatedly broadcasts the paging signaling according to a larger one of a first number of times in a certain period of time, the base station can instruct the reduced capability user equipment to monitor the paging signaling through the monitoring indication information, since the general user equipment is not instructed to monitor the paging signaling, it is unnecessary for the general user equipment to monitor the paging signaling. That is, the reduced capability user equipment can repeatedly monitor the paging signaling according to the first number of times, and it is unnecessary for the general user equipment to monitor the paging signaling according to the first number of times, thereby avoiding a waste of resources for the general user equipment on the basis of ensuring that the reduced capability user equipment can obtain the paging signaling.

In one embodiment, the monitoring indication information can be broadcast during the process of broadcasting the paging signaling by the base station. For example, if it is necessary for the first type user equipment to repeatedly monitor the paging signaling for the first number of times, it is necessary for the first type user equipment to repeatedly monitor the paging signaling for a second number of times, and the second number of times is less than the first number of times. Then, after broadcasting the paging signaling for the second number of times, the base station can broadcast the monitoring indication information, and instruct the second type user equipment to stop monitoring the paging signaling through the monitoring indication information. After receiving the monitoring indication information, the second type user equipment can stop monitoring the paging signaling, while the first type user equipment can continue monitoring. Therefore, the second type user equipment can be prevented from repeatedly monitoring the paging signaling for too many times (more than the second number of times), which is beneficial to avoiding a waste of resources for the second type user equipment.

In some examples, the monitoring indication information is a wake up signal.

In one embodiment, a wake up signal (WUS) can also be called a power-saving signal. The WUS can be used to indicate whether it is necessary for the user equipment to monitor downlink control information of the paging signaling, that is, paging DCI. The user equipment can periodically monitor the wake up signal, and if the wake up signal is monitored, it is determined it is necessary for the user equipment to monitor the downlink control information of the subsequent paging signaling; and if the wake up signal is not monitored, it is determined it is unnecessary for the user equipment to monitor the downlink control information of the subsequent paging signaling.

In this embodiment, the function of the wake up signal can be expanded, for example, by setting fields in the wake up signal or scrambling manners of the wake up signal, so that the wake up signal can not only indicate whether it is necessary for the user equipment to monitor the downlink control information of the paging signaling, but also be used as monitoring indication information to indicate the first type user equipment to monitor the paging signaling or to indicate the second type user equipment to monitor the paging signaling.

In one embodiment, a first field in the wake up signal can be set, and the first field can be an existing field in the wake up signal, or can be an expanded new field.

Specifically, when the first field set in the wake up signal is a first value, the wake up signal is used to indicate the general user equipment to monitor the paging signaling. That is, the first value related to the first field in the wake up signal can be pre-stored in the general user equipment, then after receiving the wake up signal, the first value can be compared with a value of the first field in the wake up signal, and if the value of the first field in the wake up signal is the first value, it is determined to monitor the paging signaling. When the first field in the wake up signal is a second value, the wake up signal is used to indicate the reduced capability user equipment to monitor the paging signaling. That is, the second value related to the first field in the wake up signal can be pre-stored in the reduced capability user equipment, then after receiving the wake up signal, the second value can be compared with the value of the first field in the wake up signal, and if the value of the first field in the wake up signal is the second value, it is determined to monitor the paging signaling.

In one embodiment, the scrambling manners of the wake up signal can be set, that is, the base station can scramble the wake up signal, and then transmit the scrambled wake up signal to the user equipment. The user equipment can descramble the scrambled wake up signal through a descrambling manner stored by the user equipment itself, and if the wake up signal can be descrambled, it is determined that the wake up signal is indicated for the user equipment itself.

Specifically, when the wake up signal is scrambled by a first scrambling manner, the wake up signal is used to indicate the general user equipment to monitor the paging signaling. That is, the general user equipment can descramble the wake up signal by a first descrambling manner, and if the wake up signal can be descrambled, it is determined that the wake up signal is used to indicate the general user equipment to monitor the paging signaling. When the wake up signal is scrambled by a second scrambling manner, the wake up signal is used to indicate the reduced capability user equipment to monitor the paging signaling. That is, the reduced capability user equipment can descramble the wake up signal by the second descrambling manner. If the wake up signal can be descrambled, it can be determined that the wake up signal is used to indicate the reduced capability user equipment to monitor the paging signaling.

In some examples, the monitoring indication information is downlink control information of the paging signaling.

In one embodiment, the downlink control information of the paging signaling (that is, paging DCI) can indicate the user equipment to monitor resources of the paging signaling.

In this embodiment, the function of the downlink control information can be expanded, for example, by setting fields of the downlink control information or formats of the downlink control information, so that the downlink control information can not only indicate the user equipment to monitor the resources of the paging signaling, but also be used as monitoring indication information to indicate the first type user equipment to monitor the paging signaling or to indicate the second type user equipment to monitor the paging signaling.

In one embodiment, a second field in the downlink control information can be set, and the second field can be an existing field in the downlink control information, or can be an expanded new field. Specifically, when the second field in the downlink control information is a third value, the downlink control information is used to indicate the general user equipment to monitor the paging signaling. Further, when the second field in the downlink control information is a fourth value, the downlink control information is used to indicate the reduced capability user equipment to monitor the paging signaling.

In one embodiment, a format of the downlink control information can be set, that is, the base station can send the downlink control information in different formats, and after the user equipment receives the downlink control information, the format of the downlink control information can be compared with a pre-stored format. If the format of the downlink control information is the same as the pre-stored format, it is determined that the wake up signal is indicated for the user equipment itself.

Specifically, when the format of the downlink control information is a first format, the downlink control information is used to indicate the general user equipment to monitor the paging signaling; that is, the first format is pre-stored in the general user equipment. After receiving the downlink control information, the format of the downlink control information can be compared with the first format, and if the format of the downlink control information is the first format, it can be determined that the wake up signal is used to indicate the general user equipment to monitor the paging signaling. When the format of the downlink control information is a second format, the downlink control information is used to indicate the reduced capability user equipment to monitor the paging signaling; that is, the second format is pre-stored in the reduced capability user equipment. After receiving the downlink control information, the format of the downlink control information can be compared with the second format, and if the format of the downlink control information is the second format, it can be determined that the wake up signal is used to indicate the reduced capability user equipment to monitor the paging signaling.

It should be noted that the first format and/or the second format can be an existing format in the related art, or can be a new format. For example, the first format is "DCI format 1_0", which belongs to the existing format in the related art; and the second format is "DCI format 1_3", which belongs to the new format.

In some examples, the downlink control information can include a short message, and the short message is used to indicate whether the general user equipment updates the system information, or whether the reduced capability user equipment updates the system information.

In one embodiment, the downlink control information of the paging signaling broadcast by the base station can include the short message.

In the related art, the short message is used to indicate whether all the user equipment that has received the short message updates the system information. However, in this embodiment, for the user equipment receiving the short message, the short message can be used to indicate whether the general user equipment updates the system information, or whether the reduced capability user equipment updates the system information. That is, the short message can be used to respectively indicate whether the general user equipment and the reduced capability user equipment update the system information. Therefore, when the general user equipment and the reduced capability user equipment respectively use different system information, it can be determined whether to update the system information according to the short message.

In one embodiment, a field in the short message can be set, and a value of the field can be used to indicate whether the general user equipment updates the system information, and whether the reduced capability user equipment updates the system information. Specifically, a third field in the short message can be used to indicate whether the general user equipment updates the system information, and a fourth field in the short message can be used to indicate whether the reduced capability user equipment updates the system information.

In the related art, the short message can include eight fields, but at present, only two fields in the eight fields are used, and six fields in the eight fields are unused. The third field and the fourth field in this embodiment can include two fields that have been used at present, or any one of six fields that have not been used yet.

In all embodiments of the present disclosure, the first field can include one or more bits. In all embodiments of the present disclosure, the second field can include one or more bits. In all embodiments of the present disclosure, the third field can include one or more bits. In all embodiments of the present disclosure, the fourth field can include one or more bits.

Since the system information can include a plurality of parts, for example, whether one part of the plurality of parts is updated can be indicated through systemInfoModification, and whether the other part of the plurality of parts is updated can be indicated through etwsAndCmasIndication, where etws refers to an earthquake and tsunami warning system (ETWS), and Cmas refers to a commercial mobile alert system (CMAS).

FIG. 2 is a schematic diagram of a short message in the related art. FIG. 3 is a schematic diagram of a short message according to an embodiment of the present disclosure.

In the related art, one bit in eight bits of the short message is used as systemInfoModification, and the other bit is used as etwsAndCmasIndication, therefore, there are still six bits that have not been used, as shown in FIG. 2.

In this embodiment, the third field can be set to a plurality of bits, for example, including the above two bits as systemInfoModification and etwsAndCmasIndication; and then the general user equipment can be indicated through these two bits whether to update the system information.

The fourth field can also be set to a plurality of bits, for example, including two bits of the above six unused bits. The two bits can be given meanings, namely, systemInfoModification-NR-Lite and etwsAndCmasIndication-NR-Lite; and then the reduced capability user equipment can be indicated through these two bits whether to update the system information.

In some examples, in response to a fifth field in the downlink control information being a fifth value, the downlink control information is used to indicate whether the general user equipment updates the system information; and in response to a sixth field in the downlink control information being a sixth value, the downlink control information is used to indicate whether the reduced capability user equipment updates the system information.

In one embodiment, a field in the downlink control information can be set to indicate the short message to indicate the general user equipment to update the system information, or indicate the reduced capability user equipment to update the system information. For example, when the fifth field in the downlink control information is the fifth value, the downlink control information is used to indicate the short message to indicate the general user equipment to update the system information; and when the sixth field in the downlink control information is the sixth value, the downlink control information is used to indicate the short message to indicate the reduced capability user equipment to update the system information.

The fifth field can be an existing field in the downlink control information, or can be an expanded new field. In all embodiments of the present disclosure, the fifth field can include one or more bits. In all embodiments of the present disclosure, the sixth field can include one or more bits.

FIG. 4 is a schematic flowchart illustrating a method for receiving an indication according to an embodiment of the present disclosure. The method shown in this embodiment can be applied to a terminal. The terminal can be used as user equipment to communicate with a base station, for example, the base station being applicable to the method for broadcasting the indication; and the base station can be a 5G base station. The terminal can include, but is not limited to, an electronic device such as a mobile telephone, a tablet computer, a wearable device, a sensor, and an Internet of Things (IoT) device.

As shown in FIG. 4, the method for receiving the indication can include the following steps, S201 and S202.

In step S201, monitoring indication information broadcast by a base station is received.

In step S202, it is determined whether to monitor paging signaling according to the monitoring indication information.

According to the embodiment of the present disclosure, the base station can indicate different types of user equipment to monitor the paging signaling through the monitoring indication information. Correspondingly, after receiving the monitoring indication information, the user equipment can determine whether to monitor the paging signaling. Specifically, different types of user equipment can process the monitoring indication information respectively, and processing results can be different. Based on the processing results, different types of user equipment can determine whether to monitor the paging signaling, so that it is unnecessary for different types of user equipment to monitor the paging signaling broadcast by the base station together. Therefore, when it is necessary for the base station to broadcast the paging signaling according to a larger one of a number of times of broadcasting, user equipment that is to monitor the paging signaling according to a smaller one of the number of times of broadcasting can skip monitoring, thereby avoiding a waste of resources for the user equipment.

The first type user equipment and the second type user equipment can be set as required, and these two types user equipment belong to different types. In some embodiments, a UE capability of the second type user equipment is lower than a UE capability of the first type user equipment. For example, the first type user equipment can be general user equipment, which can also be called as legacy UE (that is, traditional user equipment); and the second type user equipment can be reduced capability UE (that is, user equipment with reduced capability). Certainly, these are just examples.

In all embodiments of the present disclosure, various types of user equipment can be included, and not only the first type user equipment and the second type user equipment. In all embodiments of the present disclosure, the user equipment can be of any type, and the embodiments of the present disclosure are not limited to this.

In some examples, the monitoring indication information is a wake up signal.

FIG. 5 is a schematic flowchart illustrating a method for receiving an indication according to an embodiment of the present disclosure. As shown in FIG. 5, determining whether to monitor the paging signaling according to the monitoring indication information includes the following step S2021, which is performed after the previously described step S201.

In step S2021, in response to the terminal being general user equipment, if it is determined that a first field in the wake up signal is a first value, it is determined to monitor the paging signaling; or in response to the terminal being reduced capability user equipment, if it is determined that the first field in the wake up signal is a second value, it is determined to monitor the paging signaling.

In one embodiment, the terminal can pre-store different values of the first field in the wake up signal based on different types of the terminal itself. For example, when the terminal is the general user equipment, the first value of the first field in the wake up signal can be stored in advance; and when the terminal is the reduced capability user equipment, the second value of the first field in the wake up signal can be stored in advance.

Further, after receiving the wake up signal, the terminal can compare the stored value with a value of the first field in the wake up signal. When the terminal is the general user equipment, if it can be determined that the value of the first field in the wake up signal is the same as the pre-stored first value, it is determined to monitor the paging signaling; and when the terminal is the reduced capability user equipment, if it can be determined that the value of the first field in the wake up signal is the same as the pre-stored second value, it is determined to monitor the paging signaling.

Figure 6:
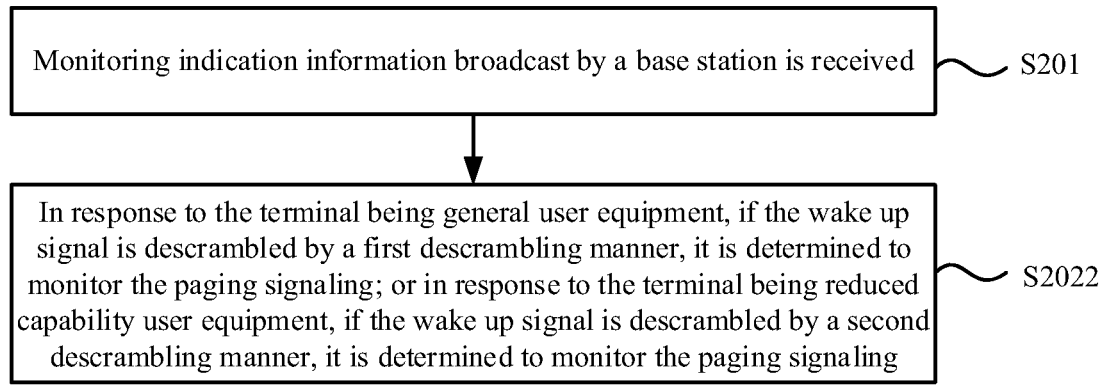
FIG. 6 is a schematic flowchart illustrating a method for receiving an indication according to an embodiment of the present disclosure.

FIG. 6 is a schematic flowchart illustrating a method for receiving an indication according to an embodiment of the present disclosure. As shown in FIG. 6, determining whether to monitor the paging signaling according to the monitoring indication information includes the following step S2022, which is performed after the previously described step S201.

In step S2022, in response to the terminal being general user equipment, if the wake up signal is descrambled by a first descrambling manner, it is determined to monitor the paging signaling; or in response to the terminal being reduced capability user equipment, if the wake up signal is descrambled by a second descrambling manner, it is determined to monitor the paging signaling.

In one embodiment, the terminal can descramble the wake up signal according to different descrambling manners based on different types of the terminal itself. For example, when the terminal is the general user equipment, the wake up signal can be descrambled according to the first descrambling manner; and when the terminal is the reduced capability user equipment, the wake up signal can be descrambled according to the second descrambling manner.

Further, after receiving the wake up signal, if the terminal can descramble the wake up signal, it is determined to monitor the paging signaling. Specifically, when it is necessary for the base station to indicate the general user equipment to monitor the paging signaling through the monitoring indication information, the wake up signal can be scrambled through the first scrambling manner corresponding to the first descrambling manner. When the terminal is the general user equipment, the wake up signal can be descrambled through the first descrambling manner. Thus, it is determined to monitor the paging signaling. When it is necessary for the base station to indicate the reduced capability user equipment to monitor the paging signaling through the monitoring indication information, the wake up signal can be scrambled through the second scrambling manner corresponding to the second descrambling manner, when the terminal is the reduced capability user equipment, the wake up signal can be descrambled through the second descrambling manner, and thus, it is determined to monitor the paging signaling.

In some examples, the monitoring indication information is downlink control information of the paging signaling.

Figure 7:
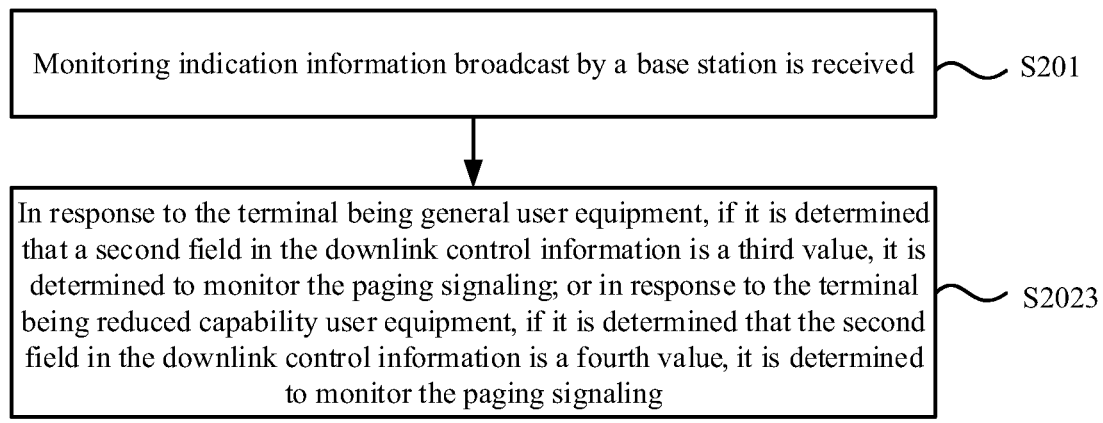
FIG. 7 is a schematic flowchart illustrating a method for receiving an indication according to an embodiment of the present disclosure.

FIG. 7 is a schematic flowchart illustrating a method for receiving an indication according to an embodiment of the present disclosure. As shown in FIG. 7, determining whether to monitor the paging signaling according to the monitoring indication information includes the following step S2023, which is performed after the previously described step S201.

In step S2023, in response to the terminal being general user equipment, if it is determined that a second field in the downlink control information is a third value, it is determined to monitor the paging signaling; or in response to the terminal being reduced capability user equipment, if it is determined that the second field in the downlink control information is a fourth value, it is determined to monitor the paging signaling.

In one embodiment, the terminal can pre-store different values of the second field in the downlink control information based on different types of the terminal itself. For example, when the terminal is the general user equipment, the third value of the second field in the downlink control information can be stored in advance; and when the terminal is the reduced capability user equipment, the fourth value of the second field in the downlink control information may be stored in advance.

Further, after receiving the wake up signal, the terminal can compare the stored value with a value of the second field in the downlink control information. When the terminal is the general user equipment, if it can be determined that the value of the second field in the downlink control information is the same as the pre-stored third value, it is determined to monitor the paging signaling; and when the terminal is the reduced capability user equipment, if it can be determined that the value of the second field in the downlink control information is the same as the pre-stored fourth value, it is determined to monitor the paging signaling.

Figure 8:
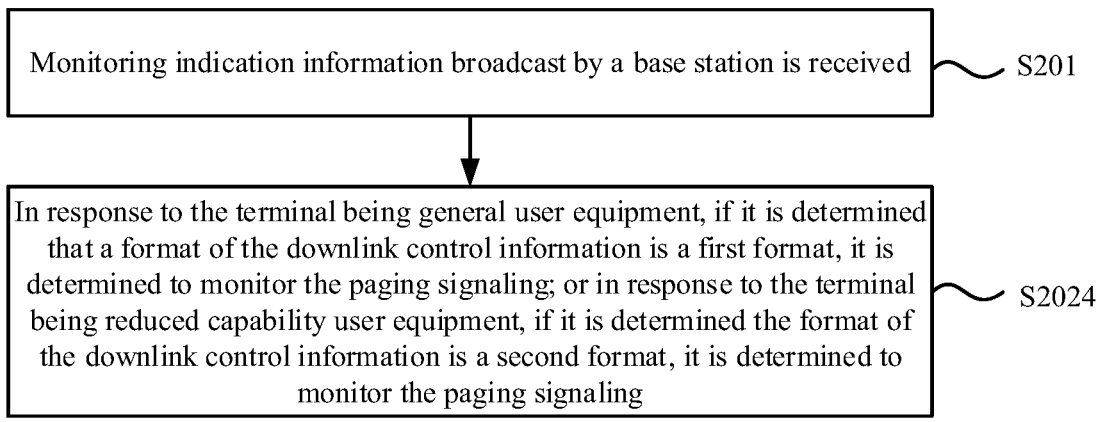
FIG. 8 is a schematic flowchart illustrating a method for receiving an indication according to an embodiment of the present disclosure.

FIG. 8 is a schematic flowchart illustrating a method for receiving an indication according to an embodiment of the present disclosure. As shown in FIG. 8, determining whether to monitor the paging signaling according to the monitoring indication information includes the following step S2024, which is performed after the previously described step S201.

In step S2024, in response to the terminal being general user equipment, if it is determined that a format of the downlink control information is a first format, it is determined to monitor the paging signaling; or in response to the terminal being reduced capability user equipment, if it is determined the format of the downlink control information is a second format, it is determined to monitor the paging signaling.

In one embodiment, the terminal can pre-store the format of the downlink control information based on different types of the terminal itself. For example, when the terminal is the general user equipment, the format of the downlink control information can be stored as the first format in advance; and when the terminal is the reduced capability user equipment, the format of the downlink control information can be stored as the second format in advance.

Further, after receiving the downlink control information, the terminal can compare the stored format with the format of the downlink control information. When the terminal is the general user equipment, if it can be determined that the format of the downlink control information is the same as the pre-stored first format, it is determined to monitor the paging signaling; and when the terminal is the reduced capability user equipment, if it can be determined that the format of the downlink control information is the same as the pre-stored second format, it is determined to monitor the paging signaling.

Figure 9:
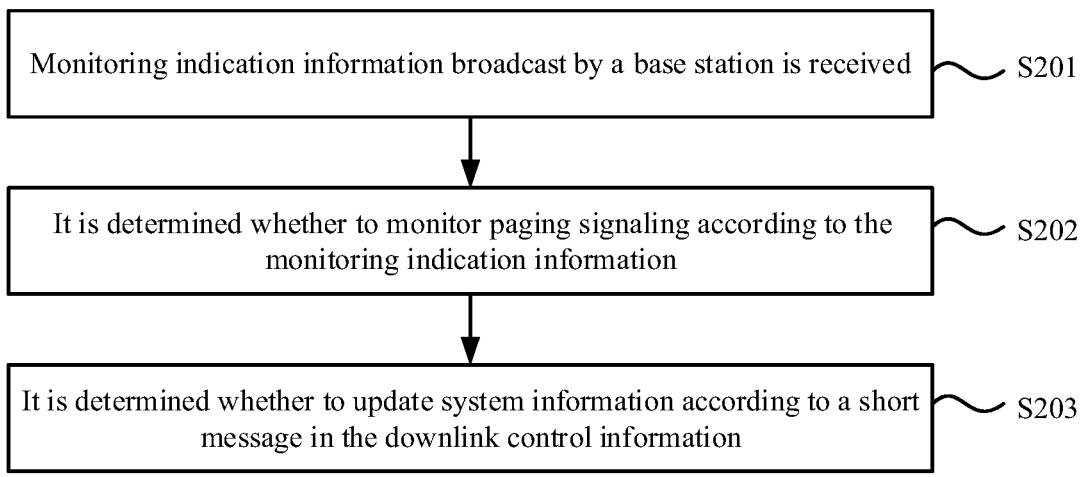
FIG. 9 is a schematic flowchart illustrating a method for receiving an indication according to an embodiment of the present disclosure.

FIG. 9 is a schematic flowchart illustrating a method for receiving an indication according to an embodiment of the present disclosure. As shown in FIG. 9, the method further includes the following step S203, which is performed after the previously described steps S201 and S202.

In step S203, it is determined whether to update system information according to a short message in the downlink control information.

Figure 10:
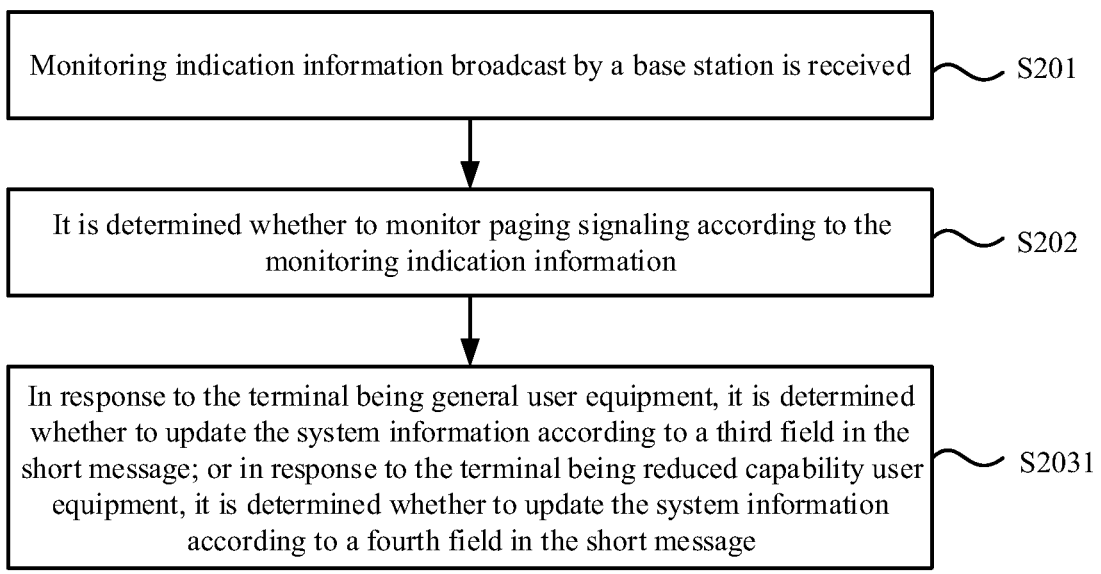
FIG. 10 is a schematic flowchart illustrating a method for receiving an indication according to an embodiment of the present disclosure.

FIG. 10 is a schematic flowchart illustrating a method for receiving an indication according to an embodiment of the present disclosure. As shown in FIG. 10, determining whether to update the system information according to the short message in the downlink control information includes the following step S2031, which is performed after the previously described steps S201 and S202.

In step S2031, in response to the terminal being general user equipment, it is determined whether to update the system information according to a third field in the short message; or in response to the terminal being reduced capability user equipment, it is determined whether to update the system information according to a fourth field in the short message.

In some examples, the third field and the fourth field are one or more fields.

Figure 11:
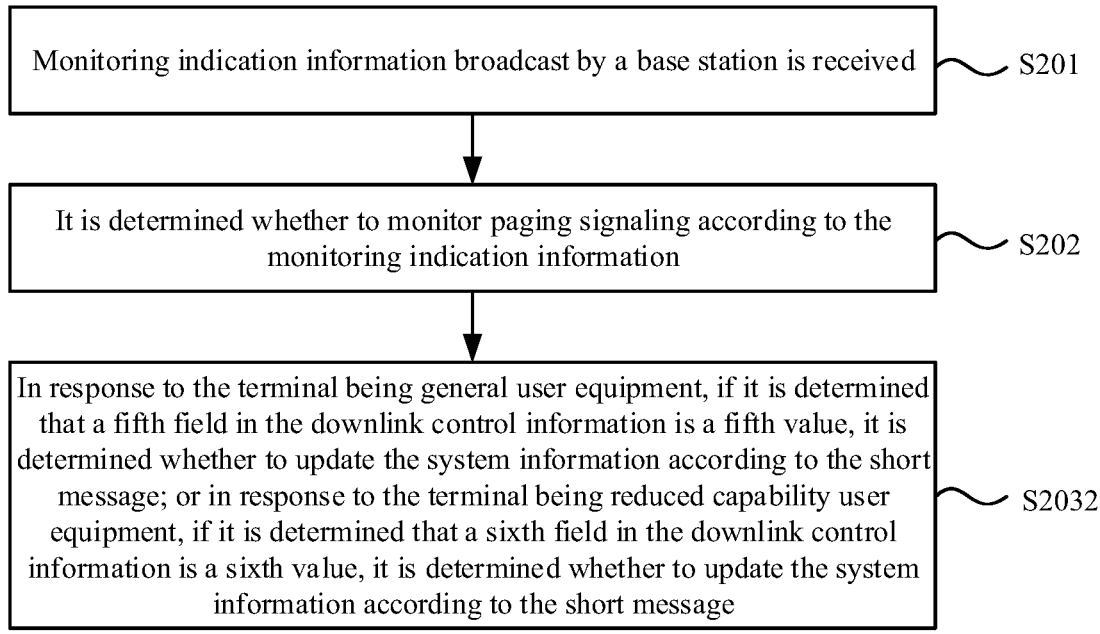
FIG. 11 is a schematic flowchart illustrating a method for receiving an indication according to an embodiment of the present disclosure.

FIG. 11 is a schematic flowchart illustrating a method for receiving an indication according to an embodiment of the present disclosure. As shown in FIG. 11, determining whether to update the system information according to the short message in the downlink control information includes the following step S2032, which is performed after the previously described steps S201 and S202.

In step S2032, in response to the terminal being general user equipment, if it is determined that a fifth field in the downlink control information is a fifth value, it is determined whether to update the system information according to the short message; or in response to the terminal being reduced capability user equipment, if it is determined that a sixth field in the downlink control information is a sixth value, it is determined whether to update the system information according to the short message.

Corresponding to the aforementioned embodiments of the method for broadcasting the indication and the method for receiving the indication, the present disclosure further provides embodiments of an apparatus for broadcasting an indication and an apparatus for receiving an indication.

Figure 12:
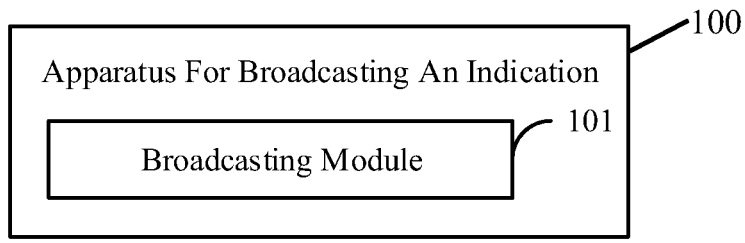
FIG. 12 is a schematic block diagram illustrating an apparatus for broadcasting an indication according to an embodiment of the present disclosure.

FIG. 12 is a schematic block diagram illustrating an apparatus for broadcasting an indication 100 according to an embodiment of the present disclosure. The apparatus shown in this embodiment can be applied to a base station. The base station can be a 5G base station, and can communicate with a terminal as user equipment. The terminal can include, but is not limited to, an electronic device such as a mobile telephone, a tablet computer, a wearable device, a sensor, and an Internet of Things (IoT) device.

As shown in FIG. 12, the apparatus for broadcasting the indication 100 can include: a broadcasting module 101 configured to broadcast monitoring indication information, where the monitoring indication information is configured to indicate a first type user equipment to monitor paging signaling or to indicate a second type user equipment to monitor the paging signaling.

In some examples, the first type user equipment is general user equipment, and the second type user equipment is reduced capability user equipment.

In some examples, the monitoring indication information is a wake up signal.

In some examples, in response to a first field in the wake up signal being a first value, the wake up signal is configured to indicate the general user equipment to monitor the paging signaling; and in response to the first field in the wake up signal being a second value, the wake up signal is configured to indicate the reduced capability user equipment to monitor the paging signaling.

In some examples, in response to the wake up signal being scrambled by a first scrambling manner, the wake up signal is configured to indicate the general user equipment to monitor the paging signaling. Further, in response to the wake up signal being scrambled by a second scrambling manner, the wake up signal is configured to indicate the reduced capability user equipment to monitor the paging signaling.

In some examples, the monitoring indication information is downlink control information of the paging signaling.

In some examples, in response to a second field in the downlink control information being a third value, the downlink control information is configured to indicate the general user equipment to monitor the paging signaling. Additionally, in response to the second field in the downlink control information being a fourth value, the downlink control information is configured to indicate the reduced capability user equipment to monitor the paging signaling.

In some examples, in response to a format of the downlink control information being a first format, the downlink control information is configured to indicate the general user equipment to monitor the paging signaling. Additionally, in response to the format of the downlink control information being a second format, the downlink control information is configured to indicate the reduced capability user equipment to monitor the paging signaling.

In some examples, the downlink control information includes a short message for indicating whether the general user equipment updates system information, or whether the reduced capability user equipment updates the system information.

In some examples, a third field in the short message is used to indicate whether the general user equipment updates the system information, and a fourth field in the short message is used to indicate whether the reduced capability user equipment updates the system information.

In some examples, in response to a fifth field in the downlink control information being a fifth value, the downlink control information is used to indicate whether the general user equipment updates the system information. Additionally, in response to a sixth field in the downlink control information being a sixth value, the downlink control information is used to indicate whether the reduced capability user equipment updates the system information.

In all embodiments of the present disclosure, the first field can include one or more bits. In all embodiments of the present disclosure, the second field can include one or more bits. In all embodiments of the present disclosure, the third field can include one or more bits. In all embodiments of the present disclosure, the fourth field can include one or more bits. In all embodiments of the present disclosure, the fifth field can include one or more bits. In all embodiments of the present disclosure, the sixth field can include one or more bits.

Figure 13:
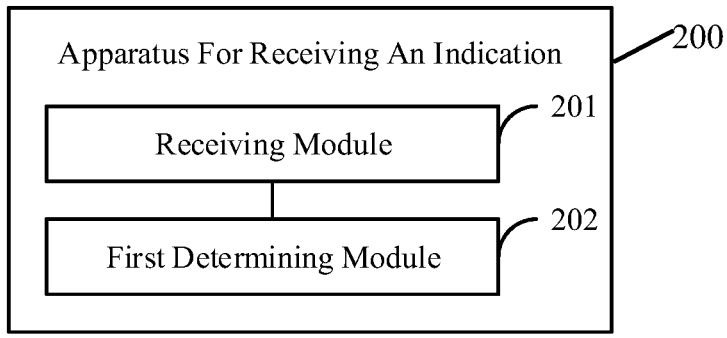
FIG. 13 is a schematic block diagram illustrating an apparatus for receiving an indication according to an embodiment of the present disclosure.

FIG. 13 is a schematic block diagram illustrating an apparatus for receiving an indication 200 according to an embodiment of the present disclosure. The apparatus shown in this embodiment can be applied to a terminal. The terminal can be used as user equipment to communicate with a base station, for example, the base station being applicable to the method for broadcasting the indication; and the base station can be a 5G base station. The terminal can include, but is not limited to, an electronic device such as a mobile telephone, a tablet computer, a wearable device, a sensor, and an Internet of Things (IoT) device.

As shown in FIG. 13, the apparatus for receiving the indication 200 can include: a receiving module 201 and a first determining module 202.

The receiving module 201 is configured to receive monitoring indication information broadcast by a base station. The first determining module 202 configured is to determine whether to monitor paging signaling according to the monitoring indication information.

In some examples, the monitoring indication information is a wake up signal.

In some examples, the first determining module 202 is configured to, in response to the terminal being general user equipment, if it is determined that a first field in the wake up signal is a first value, determine to monitor the paging signaling; or in response to the terminal being reduced capability user equipment. If it is determined that the first field in the wake up signal is a second value, determine to monitor the paging signaling.

In some examples, the first determining module 202 is configured to, in response to the terminal being general user equipment, if the wake up signal is descrambled by a first descrambling manner, determine to monitor the paging signaling; or in response to the terminal being reduced capability user equipment. If the wake up signal is descrambled by a second descrambling manner, determine to monitor the paging signaling.

In some examples, the monitoring indication information is downlink control information of the paging signaling.

In some examples, the first determining module 202 is configured to, in response to the terminal being general user equipment, if it is determined that a second field in the downlink control information is a third value, determine to monitor the paging signaling; or in response to the terminal being reduced capability user equipment, if it is determined that the second field in the downlink control information is a fourth value, determine to monitor the paging signaling.

In some examples, the first determining module 202 is configured to, in response to the terminal being general user equipment, if it is determined that a format of the downlink control information is a first format, determine to monitor the paging signaling; or in response to the terminal being reduced capability user equipment, if it is determined the format of the downlink control information is a second format, determine to monitor the paging signaling.

Figure 14:
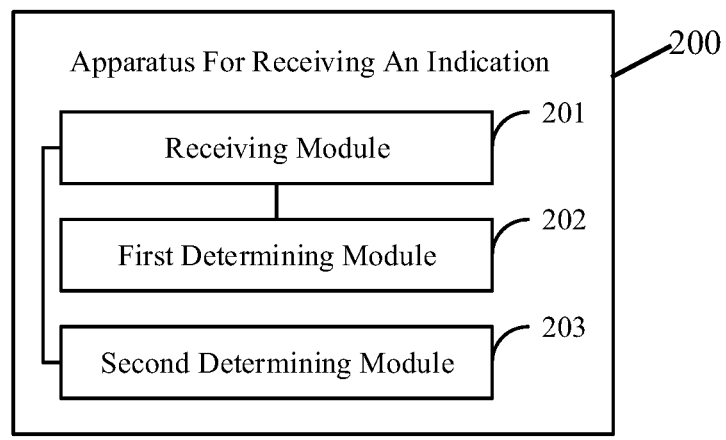
FIG. 14 is a schematic block diagram illustrating an apparatus for receiving an indication according to an embodiment of the present disclosure.

FIG. 14 is a schematic block diagram illustrating an apparatus for receiving an indication 200 according to an embodiment of the present disclosure. As shown in FIG. 14, the apparatus 200 includes the receiving module 201 and the first determining module 202, and further includes a second determining module 203.

The second determining module 203 is configured to determine whether to update system information according to a short message in the downlink control information.

In some examples, the second determining module 203 is configured to, in response to the terminal being general user equipment, determine whether to update the system information according to a third field in the short message; or in response to the terminal being reduced capability user equipment, determine whether to update the system information according to a fourth field in the short message.

In some examples, the third field and the fourth field are one or more fields.

In some examples, the second determining module 203 is configured to, in response to the terminal being general user equipment, if it is determined that a fifth field in the downlink control information is a fifth value, determine whether to update the system information according to the short message; or in response to the terminal being reduced capability user equipment, if it is determined that a sixth field in the downlink control information is a sixth value, determine whether to update the system information according to the short message.

Regarding the apparatus in the above embodiment, the specific manner in which each module performs the operation has been described in detail in the embodiment of the method, which will not be elaborated here.

For the apparatus embodiment, since it basically corresponds to the method embodiment, the relevant part may refer to the part of the description of the method embodiment. The apparatus embodiments described above are merely illustrative, where the units described as separate components may or may not be physically separated, and the components displayed as units may or may not be physical units. That is, they may be located in one place or may be distributed to a plurality of network units. Some or all of the modules may be selected according to actual needs, to achieve the objectives of the solutions of the present disclosure. Those skilled in the art may understand and implement without creative labor.

According to the embodiments of the present disclosure, there is provided an electronic device, including: a processor; and a memory for storing instructions executable by the processor. Where the processor is configured to implement the method for broadcasting the indication described in any one of the above embodiments and/or the method for receiving the indication described in any one of the above embodiments.

According to the embodiments of the present disclosure, there is provided a computer readable storage medium storing a computer program, where the computer program, when executed by a processor, causing the processor to implement the steps of the method for broadcasting the indication described in any one of the above embodiments and/or the steps of the method for receiving the indication described in any one of the above embodiments.

Figure 15:
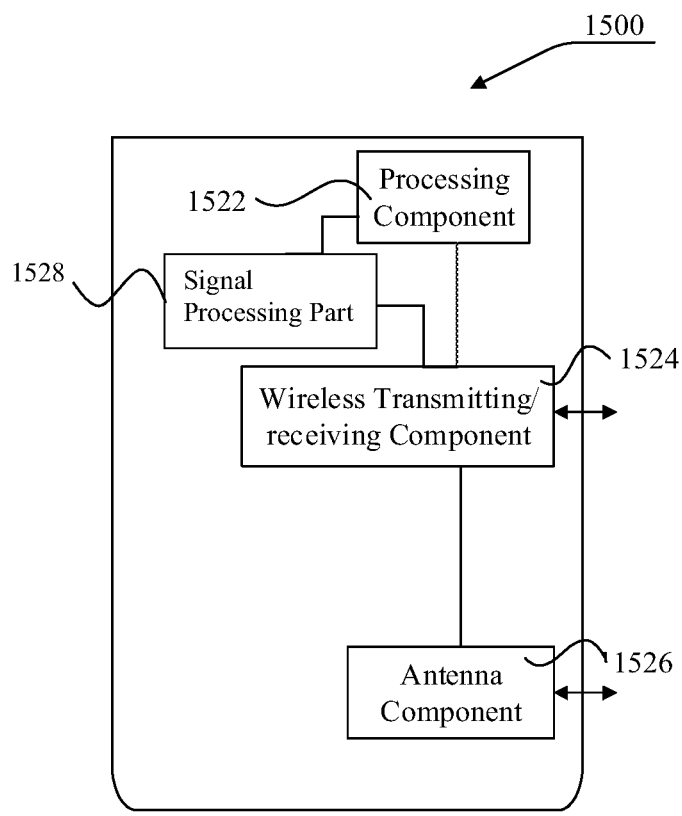
FIG. 15 is a schematic block diagram illustrating an apparatus for broadcasting an indication according to an embodiment of the present disclosure.

As shown in FIG. 15, FIG. 15 is a schematic block diagram illustrating an apparatus for broadcasting an indication 1500 according to an embodiment of the present disclosure. The apparatus 1500 can be provided as a base station. Referring to FIG. 15, the apparatus 1500 includes a processing component 1522, a wireless transmitting/receiving component 1524, an antenna component 1526, and a signal processing part 1528 specific to a wireless interface, such as a digital signal processor. The processing component 1522 can further include one or more processors. One of the processors in the processing component 1522 can be configured to implement the method for broadcasting the indication described in any of the above embodiments.

Figure 16:
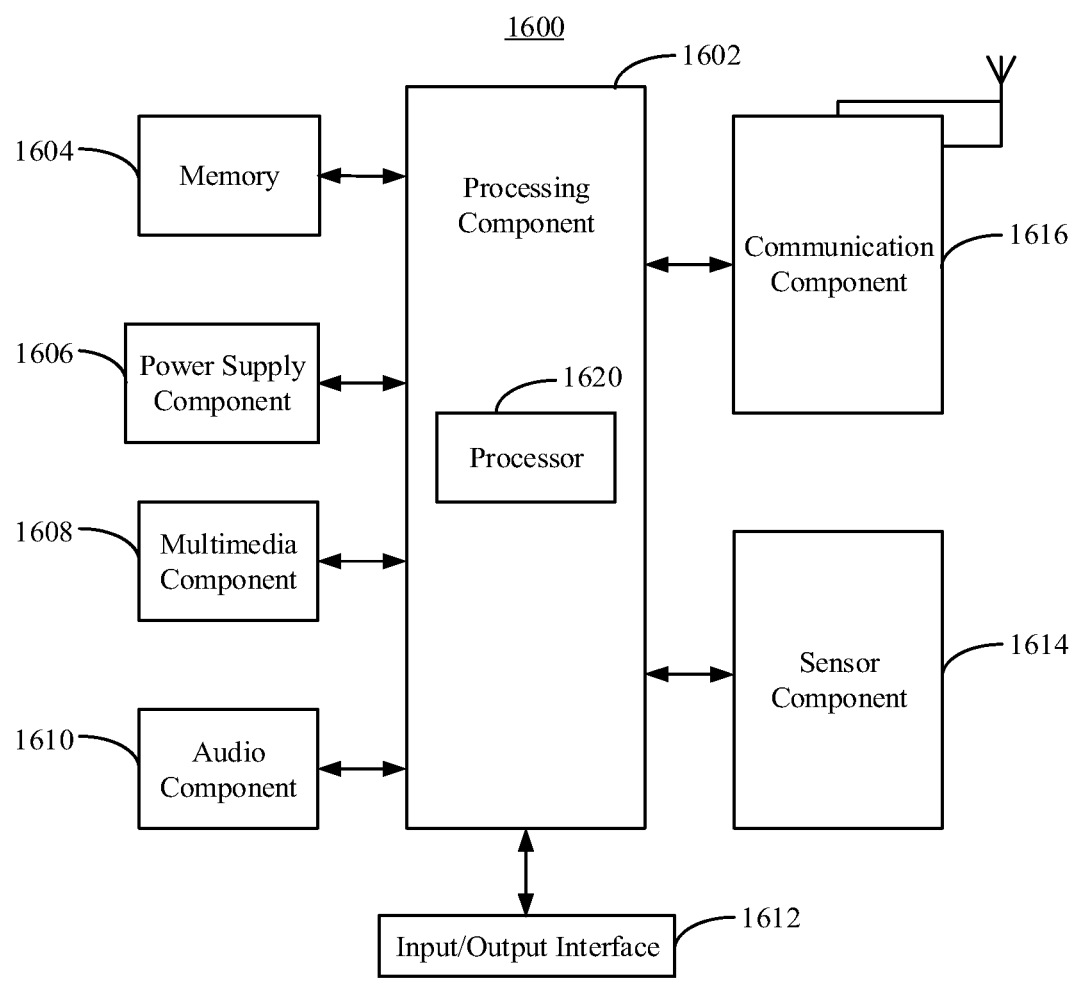
FIG. 16 is a schematic block diagram illustrating an apparatus for receiving an indication according to an embodiment of the present disclosure.

FIG. 16 is a schematic block diagram illustrating an apparatus 1600 for receiving an indication according to an embodiment of the present disclosure. For example, the apparatus 1600 can be a mobile telephone, a computer, a digital broadcasting terminal, a message receiving and transmitting device, a game console, a tablet device, a medical device, a fitness device, a personal digital assistant, and the like.

Referring to FIG. 16, the apparatus 1600 may include one or more of the following components: a processing component 1602, a memory 1604, a power supply component 1606, a multimedia component 1608, an audio component 1610, an input/output (I/O) interface 1612, a sensor component 1614, and a communication component 1616.

The processing component 1602 generally controls overall operations of the apparatus 1600, such as operations associated with display, phone calls, data communications, camera operations, and recording operations. The processing component 1602 may include one or more processors 1620 to execute instructions to complete all or part of the steps of the above methods. In addition, the processing component 1602 may include one or more modules that facilitate the interaction between the processing component 1602 and other components. For example, the processing component 1602 may include a multimedia module to facilitate the interaction between the multimedia component 1608 and the processing component 1602.

The memory 1604 stores various types of data to support the operation of apparatus 1600. Examples of such data include instructions for any application or method operated on the apparatus 1600, contact data, phonebook data, messages, pictures, videos, and so on. The memory 1604 may be implemented by any type of volatile or non-volatile storage devices or a combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or optical disk.

The power supply component 1606 provides power to different components of the apparatus 1600. The power supply component 1606 may include a power management system, one or more power supplies, and other components associated with generating, managing, and distributing power for the apparatus 1600.

The multimedia component 1608 includes a screen providing an output interface between the apparatus 1600 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense duration and a pressure associated with the touch or swipe. In some embodiments, the multimedia component 1608 may include a front camera and/or a rear camera. The front camera and/or rear camera may receive external multimedia data when the apparatus 1600 is in an operating mode, such as a photographing mode or a video mode. Each of the front camera and the rear camera may be a fixed optical lens system or have focal length and optical zooming capability.

The audio component 1610 is configured to output and/or input an audio signal. For example, the audio component 1610 includes a microphone (MIC). When the apparatus 1600 is in an operating mode, such as a call mode, a recording mode, and a voice recognition mode, the MIC is to receive an external audio signal. The received audio signal may be further stored in the memory 1604 or transmitted via the communication component 1616. In some embodiments, the audio component 1610 further includes a speaker to output an audio signal.

The I/O interface 1612 may provide an interface between the processing component 1602 and peripheral interface modules. The above peripheral interface modules may include a keyboard, a click wheel, buttons, and so on. These buttons may include, but are not limited to, a home button, a volume button, a starting button and a locking button.

The sensor component 1614 includes one or more sensors to provide status assessments of various aspects for the apparatus 1600. For example, the sensor component 1614 may detect the on/off status of the apparatus 1600, and relative positioning of component, for example, the component is a display and a keypad of the apparatus 1600. The sensor component 1614 may also detect a change in position of the apparatus 1600 or a component of the apparatus 1600, a presence or absence of the contact between a user and the apparatus 1600, an orientation or an acceleration/deceleration of the apparatus 1600, and a change in temperature of the apparatus 1600. The sensor component 1614 may include a proximity sensor to detect the presence of a nearby object without any physical contact. The sensor component 1614 may further include an optical sensor, such as a Complementary Metal Oxide Semiconductor (CMOS) or Charge-coupled Device (CCD) image sensor, which is used in imaging applications. In some embodiments, the sensor component 1614 may further include an acceleration sensor, a gyroscope sensor, a magnetic sensor, a pressure sensor, or a temperature sensor.

The communication component 1616 is to facilitate wired or wireless communication between the apparatus 1600 and other devices. The apparatus 1600 may access a wireless network that is based on a communication standard, such as Wi-Fi, 2G, or 3G, or a combination thereof. In an exemplary embodiment, the communication component 1616 receives a broadcast signal or broadcast-associated information from an external broadcast management system via a broadcast channel. In an exemplary embodiment, the communication component 1616 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Blue Tooth (BT) technology, and other technologies.

In an exemplary embodiment, the apparatus 1600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above method for receiving the indication.

In an exemplary embodiment, there is also provided a non-transitory computer readable storage medium including instructions, such as the memory 1604 including instructions. The instructions may be executed by the processor 1620 of the apparatus 1600 to perform the above described methods. For example, the non-transitory computer readable storage medium may be a ROM, a Random Access Memory (RAM), a CD-ROM, a magnetic tape, a floppy disk, an optical data storage device, and the like.

Other implementations of the present disclosure will be apparent to those skilled in the art from consideration of the specification and practice of the present disclosure herein. The present disclosure is intended to cover any variations, uses, modifications, or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relation or order existing between these entities or operations. Also, the terms "including", "containing", or any variation thereof is intended to cover non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in the process, method, article, or device including the elements.

The methods and apparatuses provided by the embodiments of the present disclosure have been described in detail above. Specific examples are used herein to explain the principles and implementations of the present disclosure. The description of the above embodiments is only used to help understand methods and core ideas in the present disclosure. At the same time, those of ordinary skill in the art can apply some changes in the specific implementation and the scope of application based on the idea of the present disclosure. In conclusion, the content of the present specification should not be construed as any limitation to the present disclosure.

The invention claimed is:

1. A method for broadcasting an indication, being applicable to a base station, the method comprising:
broadcasting monitoring indication information, wherein the monitoring indication information is configured to indicate first type user equipment to monitor paging signaling or to indicate second type user equipment to monitor the paging signaling; wherein the first type user equipment is general user equipment, and the second type user equipment is reduced capability user equipment;
wherein the monitoring indication information is a wake up signal;
in response to an expanded new first field in the wake up signal being a first value, the wake up signal is configured to indicate the first type user equipment to monitor the paging signaling, and
in response to the expanded new first field in the wake up signal being a second value, the wake up signal is configured to indicate the second type user equipment to monitor the paging signaling.

2. The method according to claim 1, wherein
the wake up signal configured to indicate the first type user equipment to monitor the paging signaling is scrambled by a first scrambling manner, and
the wake up signal configured to indicate the second type user equipment to monitor the paging signaling is scrambled by a second scrambling manner.

3. The method according to claim 1, wherein a user equipment capability of the second type user equipment is lower than a user equipment capability of the first type user equipment.

4. A non-transitory computer-readable storage medium storing a computer program, wherein the computer program, when executed by a processor, implements steps of the method for broadcasting an indication according to claim 1.

5. A method for receiving an indication, being applicable to a terminal, the method comprising:
receiving monitoring indication information broadcast by a base station, wherein the monitoring indication information is a wake up signal; and
determining whether to monitor paging signaling according to the monitoring indication information, which comprises:
in response to the terminal being a first type user equipment, which is general user equipment, if an expanded new first field in the wake-up signal is a first value, determining to monitor the paging signaling; or
in response to the terminal being second type user equipment which is reduced capability user equipment, if the expanded new first field in the wake up signal is a second value, determining to monitor the paging signaling.

6. The method according to claim 5, wherein
in response to the terminal being the first type user equipment, the wake up signal is descrambled by a first descrambling manner; or
in response to the terminal being the second type user equipment, the wake up signal is descrambled by a second descrambling manner.

7. The method according to claim 5, wherein a user equipment capability of the second type user equipment is lower than a user equipment capability of the first type user equipment.

8. An electronic device, comprising:
a processor; and
a memory for storing instructions executable by the processor,
wherein the processor is configured to implement the method for receiving an indication according to claim 5.

9. A non-transitory computer-readable storage medium storing a computer program, wherein the computer program, when executed by a processor, implements steps of the method for receiving an indication according to claim 5.

10. An electronic device, comprising:
a processor; and
a memory for storing instructions executable by the processor,
wherein the processor is configured to:
broadcast monitoring indication information, wherein the monitoring indication information is configured to indicate first type user equipment to monitor paging signaling or to indicate second type user equipment to monitor the paging signaling; wherein the first type user equipment is general user equipment, and the second type user equipment is reduced capability user equipment;

wherein the monitoring indication information is a wake up signal;
- in response to an expanded new first field in the wake-up signal being a first value, the wake-up signal is configured to indicate the first type of user equipment to monitor the paging signaling, and
- in response to the expanded new first field in the wake up signal being a second value, the wake up signal is configured to indicate the second type user equipment to monitor the paging signaling.

* * * * *